United States Patent Office 2,923,726
Patented Feb. 2, 1960

2,923,726

NITROISOCYANATES

Karl Klager, Monrovia, Calif., assignor to Aerojet-General Corporation, Azusa, Calif., a corporation of Ohio No Drawing. Application January 21, 1954
Serial No. 405,515

8 Claims. (Cl. 260—453)

This invention relates to new compounds and a new method for their preparation. In particular, it relates to nitro-substituted isocyanates having the general formula:

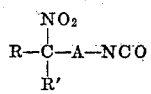

wherein A is a lower alkylene radical, R is an alkyl or carbo-alkoxy-alkylene radical and R' is a nitro, alkyl or hydrogen radical.

These compounds readily combine with alcohols to form a wide variety of urethanes having great importance as high explosives. The dinitro and carboalkoxy substituted isocyanates are particularly useful for this purpose due to their unusually high oxygen content. The isocyanates of this invention also find valuable use as waterproofing agents for paper.

The isocyanates of this invention are prepared by reacting a corresponding acid halide with an azide of an alkali or alkaline earth metal and allowing a subsequent rearrangement to occur under anhydrous conditions to obtain the desired isocyanate, as illustrated by the general reaction scheme set forth below:

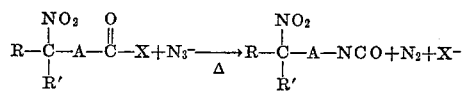

wherein X is a halogen radical, A is a lower alkylene radical, R is an alkyl or carboalkoxy-alkylene radical, and R' is a nitro, alkyl or hydrogen radical.

The acid halides employed as starting materials in the above reaction are prepared by reacting their corresponding acids with a thionyl halide. The carboalkoxy-alkylene dinitro acids are prepared by condensing an unsaturated acid, e.g. acrylic acid, with the nitronate salt of a nitro-containing ester such as methyl-4,4-dinitrobutyrate, as described in the Journal of Organic Chemistry, volume 16, pages 161–4, 1951. The other nitro acids are prepared by the oxidation of their corresponding alcohols, as described in assignee's copending application No. 392,476, filed November 16, 1953, now abandoned.

To more fully illustrate the invention the following examples are presented. It is to be understood, however, that these examples are presented merely as a means of illustration and are not intended to limit the scope of the invention in any way.

EXAMPLE I

*Preparation of 3,3-dinitrobutyl isocyanate*

A solution of 4,4-dinitropentanoyl chloride in acetone was added dropwise to an aqueous solution of sodium azide while the temperature was maintained at about 20° C. Crystals formed which were collected by filtration, washed free of acetone and dissolved in chloroform. The chloroform solution was rendered anhydrous and then refluxed until the evolution of nitrogen ceased. The solvent was then evaporated and the remaining oil was distilled at a temperature of 106–110° C./1µ. The product exhibited a M.P. of −10° C., $n_D^{25}=1.4708$.

EXAMPLE II

*Preparation of 3-nitro-3-methylbutyl isocyanate*

A solution of 4-nitro-4-methylpentanoyl chloride in chloroform was added dropwise and with vigorous stirring to an aqueous solution of sodium azide, while maintaining the temperature at about 20–25° C. The mixture was stirred for an additional hour, whereupon the chloroform solution was separated, dried, filtered and distilled under reduced pressure. The solution was then refluxed until the evolution of nitrogen ceased. The solvent was then removed and the remaining oil distilled at 68° C./5µ. The product exhibited an index of refraction of $n_D^{25}=1.4520$.

EXAMPLE III

*Preparation of 5-carbomethoxy-3,3-dinitropentyl isocyanate*

6-carbomethoxy-4,4-dinitrohexanoyl chloride, dissolved in acetone, was added to a solution of sodium azide in water. An oil separated immediately, which after additional agitation for 45 minutes was extracted from the mixture with chloroform. The chloroform solution was washed with water, sodium bisulfite and sodium bicarbonate. After drying over sodium sulfate the chloroform solution was refluxed until the nitrogen evolution ceased. The solvent was removed in vacuum and the remaining oil was distilled at 140–150° C./5µ to yield a colorless liquid, $n_D^{25}=1.4793$.

For reasons of convenience and cost, it is preferred to employ acid chlorides as starting materials for the preparation of the monoisocyanates of this invention.

This invention provides an entirely new series of nitro-containing monoisocyanates as well as a convenient method for their preparation. Any of the nitro-containing acid halides disclosed will undergo this reaction to form the valuable intermediates of this invention. Thus, it is apparent that a wide variety of nitro-containing mono-isocyanates such as 3,3-dinitrohexyl isocyanate, 5-carbo-ethoxy-2,2-dinitrobutyl isocyanate, 3-ethyl-3-nitrohexyl isocyanate, 4-carbopropoxy-3,3-dinitrobutyl isocyanate, and 4-carbomethoxy-3-methyl-3-nitrobutyl isocyanate can be prepared by merely selecting an appropriate acid halide, treating it with an azide salt and allowing the subsequent rearrangement to take place under anhydrous conditions, in accordance with the teachings of this invention.

I claim:

1. As new compositions of matter, the nitro-containing monoisocyanates having the general formula:

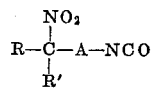

wherein A is a lower alkylene radical, R is a radical selected from the group consisting of lower alkyl and lower carboalkoxy-lower alkylene radicals, and R' is a radical selected from a group consisting of nitro, lower alkyl and hydrogen radicals.

2. As a new composition of matter, 3,3-dinitrobtuyl isocyanate having the structural formula:

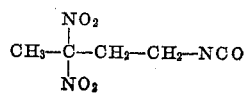

3. As a new composition of matter, 3-nitro-3-methylbutyl isocyanate having the structural formula:

$$CH_3-\underset{\underset{CH_3}{|}}{\overset{\overset{NO_2}{|}}{C}}-CH_2-CH_2-NCO$$

4. As a new composition of matter, 5-carbomethoxy-3,3-dinitropentyl isocyanate having the structural formula:

$$CH_3O-\overset{\overset{O}{\|}}{C}-CH_2CH_2-\underset{\underset{NO_2}{|}}{\overset{\overset{NO_2}{|}}{C}}-CH_2CH_2-NCO$$

5. The method of preparing nitro-containing monoisocyanates having the general formula:

$$R-\underset{\underset{NO_2}{|}}{\overset{\overset{NO_2}{|}}{C}}-A-NCO$$

which comprises reacting a nitro acid halide having the general formula:

$$R-\underset{\underset{R'}{|}}{\overset{\overset{NO_2}{|}}{C}}-A-\overset{\overset{O}{\|}}{C}X$$

wherein X is a halogen radical, A is a lower alkylene radical, R is a radical selected from a group consisting of lower alkyl and lower carboalkoxy lower alkylene radicals, and R' is a radical selected from a group consisting of nitro, lower alkyl and hydrogen radicals; with an azide of an element selected from the group consisting of alkali and alkaline earth metals and subsequently heating under anhydrous conditions to effect rearrangement.

6. The method of preparing 3,3-dinitrobutyl isocyanate which comprises reacting 4,4-dinitropentanoyl chloride with sodium azide in aqueous solution and subsequently heating under anhydrous conditions.

7. The method of preparing 3-nitro-3-methylbutyl isocyanate which comprises reacting 4-nitro-4-methylpentanoyl chloride with sodium azide in aqueous solution and subsequently heating under anhydrous conditions.

8. The method of preparing 5-carbomethoxy-3,3-dinitropentanoyl isocyanate which comprises reacting 6-carbomethoxy-4,4-dinitrohexanoyl chloride with sodium azide in aqueous solution and subsequently heating under anhydrous conditions.

References Cited in the file of this patent

UNITED STATES PATENTS

| | | |
|---|---|---|
| 2,334,476 | Coffman | Nov. 16, 1943 |
| 2,668,176 | Klager | Feb. 2, 1954 |

OTHER REFERENCES

"An Outline of Organic Compounds," by E. F. Degering. University Lithoprinters, Ypsilanti, Mich. (1945), pages 541, 543, 544.